(12) United States Patent
Chan

(10) Patent No.: US 7,895,179 B2
(45) Date of Patent: Feb. 22, 2011

(54) ASYNCHRONOUS UPDATING OF WEB PAGE DATA VIEWS

(75) Inventor: Gregory L. Chan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 11/768,095

(22) Filed: Jun. 25, 2007

(65) Prior Publication Data

US 2008/0320050 A1    Dec. 25, 2008

(51) Int. Cl.
*G06F 7/00* (2006.01)
*G06F 17/30* (2006.01)

(52) U.S. Cl. .................. 707/706; 707/754; 707/758; 715/273; 715/277; 719/329

(58) Field of Classification Search ........... None
See application file for complete search history.

(56) References Cited

U.S. PATENT DOCUMENTS

| | | | | |
|---|---|---|---|---|
| 6,094,662 | A | 7/2000 | Hawes | 707/104 |
| 6,243,089 | B1 * | 6/2001 | Gong | 715/744 |
| 6,931,416 | B2 * | 8/2005 | Kelley et al. | 707/102 |
| 2002/0075325 | A1 * | 6/2002 | Allor et al. | 345/853 |
| 2002/0188936 | A1 | 12/2002 | Bojanic et al. | 717/171 |
| 2003/0177175 | A1 | 9/2003 | Worley et al. | 709/203 |
| 2003/0192030 | A1 * | 10/2003 | Hostettler | 717/115 |
| 2004/0199543 | A1 | 10/2004 | Braud et al. | 707/104.1 |
| 2004/0225633 | A1 | 11/2004 | Jau | 707/1 |
| 2005/0188007 | A1 | 8/2005 | Warner et al. | 709/203 |
| 2006/0277167 | A1 | 12/2006 | Gross et al. | 707/3 |
| 2007/0083533 | A1 * | 4/2007 | Mirkazemi et al. | 707/100 |
| 2007/0113201 | A1 * | 5/2007 | Bales et al. | 715/810 |
| 2007/0124460 | A1 * | 5/2007 | McMullen et al. | 709/224 |
| 2007/0234195 | A1 * | 10/2007 | Wells | 715/501.1 |
| 2008/0077653 | A1 * | 3/2008 | Morris | 709/203 |
| 2008/0183573 | A1 * | 7/2008 | Muschetto | 705/14 |
| 2009/0031301 | A1 * | 1/2009 | D'Angelo et al. | 717/178 |

OTHER PUBLICATIONS

Building Rich Web Applications with Ajax http://userpages.umbc.edu/~dhood2/courses/cmsc433/fall2006/Miscellaneous/ajax.pdf.
Simplifying Ajax-Style Web Development http://lesia.com/content/articles/SimplifyingAjaxWebDevelopment.pdf.

(Continued)

*Primary Examiner*—Mohammad Ali
*Assistant Examiner*—Patrick A Darno
(74) *Attorney, Agent, or Firm*—Merchant & Gould

(57) ABSTRACT

Embodiments are provided to create and manage data view modules for updating data on a web page, without having to reload the entire web page to view the updated data. In one embodiment, a static data view module for viewing web data is modified utilizing an asynchronous update function which provides asynchronous update behavior for the data view module. The asynchronous update function enables the data view module to automatically update data displayed in a data view independently of data displayed in other static data views which may be present in a web page and which may only be updated by reloading the entire web page. In another embodiment, application programming interfaces (APIs) may be provided in the modified data view module which, when exposed, facilitate the building of customized data views by providing asynchronous update behavior for customized data view modules in a web page.

12 Claims, 8 Drawing Sheets

OTHER PUBLICATIONS

Linda Dailey Parson: Building Rich Web Applications with Ajax. Oct. 2005, pp. 1-4 http://userpages.umbc.edu/~dhood2/courses/cmsc433/fall2006/Miscellaneous/ajax.pdf.

Kevin Smith: Simplifying Ajax-Style Web Development. May 2006, pp. 1-4 http://lesia.com/content/articles/SimplifyingAjaxWebDevelopment.pdf.

* cited by examiner

FIGURE 3B

| BASIC | NEWS | SPORTS | ENTERTAINMENT | ADD A PAGE | SHARE | 302 |

▼ WEATHER FORECASTS    EDIT X

SEATTLE, WA: 52°F, CLOUDY

| TUESDAY | WEDNESDAY | THURSDAY | FRIDAY |
| 66°/46° | 69°/48° | 70°/49° | 70°/50° |

POWERED BY: FORECA

▼ MSN MONEY STOCK QUOTES    EDIT X

| SYMBOL | PRICE | CHANGE | %CHG |
|---|---|---|---|
| $INDU | 13541.90 | -0.98 | -0.01% |
| $COMPX | 2578.59 | -0.20 | -0.01% |
| $INX | 1523.73 | -1.37 | -0.09% |

QUOTES FROM IDC COMSTOCK 20 MIN DELAY

304

▼ MSNBC.COM TOP MSNBC HEADLINES    EDIT X

UK: RUSSIAN MURDERED EX-KGB SPY [MORE]
AID CONVOY HIT NEAR LEBANON CAMP [MORE]
ISRAELI STRIKES TARGET HAMAS CAMPS [MORE]
WP: AFTER FALWELL, EVANGELICALS AT CROSSROADS [MORE]
WAYWARD WHALES STALL AGAIN [MORE]
READ ALL

306

PRIVACY | LEGAL | DISCOVER WINDOWS LIVE
HELP | ACCOUNT | FEEDBACK

*FIGURE 3C*

ASYNCHRONOUS UPDATING OF WEB PAGE DATA VIEWS

BACKGROUND

Web site owners may simultaneously display information from several information service providers in multiple "data views" for users on a web page. For example, an information services web page may simultaneously display "live" data such as weather forecast information, news headlines, stock quotes, company information (such as customer data), and the like in multiple data views. In the past, data views have been "static" which imposes several limitations on user interaction with displayed data. These limitations include having to reload the entire web page (including data views which may not need to be updated) or visit other pages in order to perform basic operations such as updating data, adding data, filtering data and sorting data.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to create and manage data view modules for updating data on a web page, without having to reload the entire web page to view the updated data. In one embodiment, a static data view module for viewing web data is modified utilizing an asynchronous update function which provides asynchronous update behavior for the data view module. The asynchronous update function enables the data view module to automatically update data displayed in a data view independently of data displayed in other static data views which may be present in a web page and which may only be updated by reloading the entire web page. In another embodiment, application programming interfaces (APIs) may be provided in the modified data view module which, when exposed, facilitate the building of customized data views by providing asynchronous update behavior for customized data view modules in a web page.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 3B is a screenshot diagram of an illustrative web page showing a visual indicator signifying that a data view is asynchronously being updated in a web page, in accordance with various embodiments;

FIG. 3C is a screenshot diagram of an illustrative web page showing an asynchronously updated data view, in accordance with various embodiments;

DETAILED DESCRIPTION

Embodiments are provided to create and manage data view modules for updating data on a web page, without having to reload the entire web page to view the updated data. In one embodiment, a static data view module for viewing web data is modified utilizing an asynchronous update function which provides asynchronous update behavior for the data view module. The asynchronous update function enables the data view module to automatically update data displayed in a data view independently of data displayed in other static data views which may be present in a web page and which may only be updated by reloading the entire web page. In another embodiment, application programming interfaces (APIs) may be provided in the modified data view module which, when exposed, facilitate the building of customized data views by providing asynchronous update behavior for customized data view modules in a web page.

Figure 1:
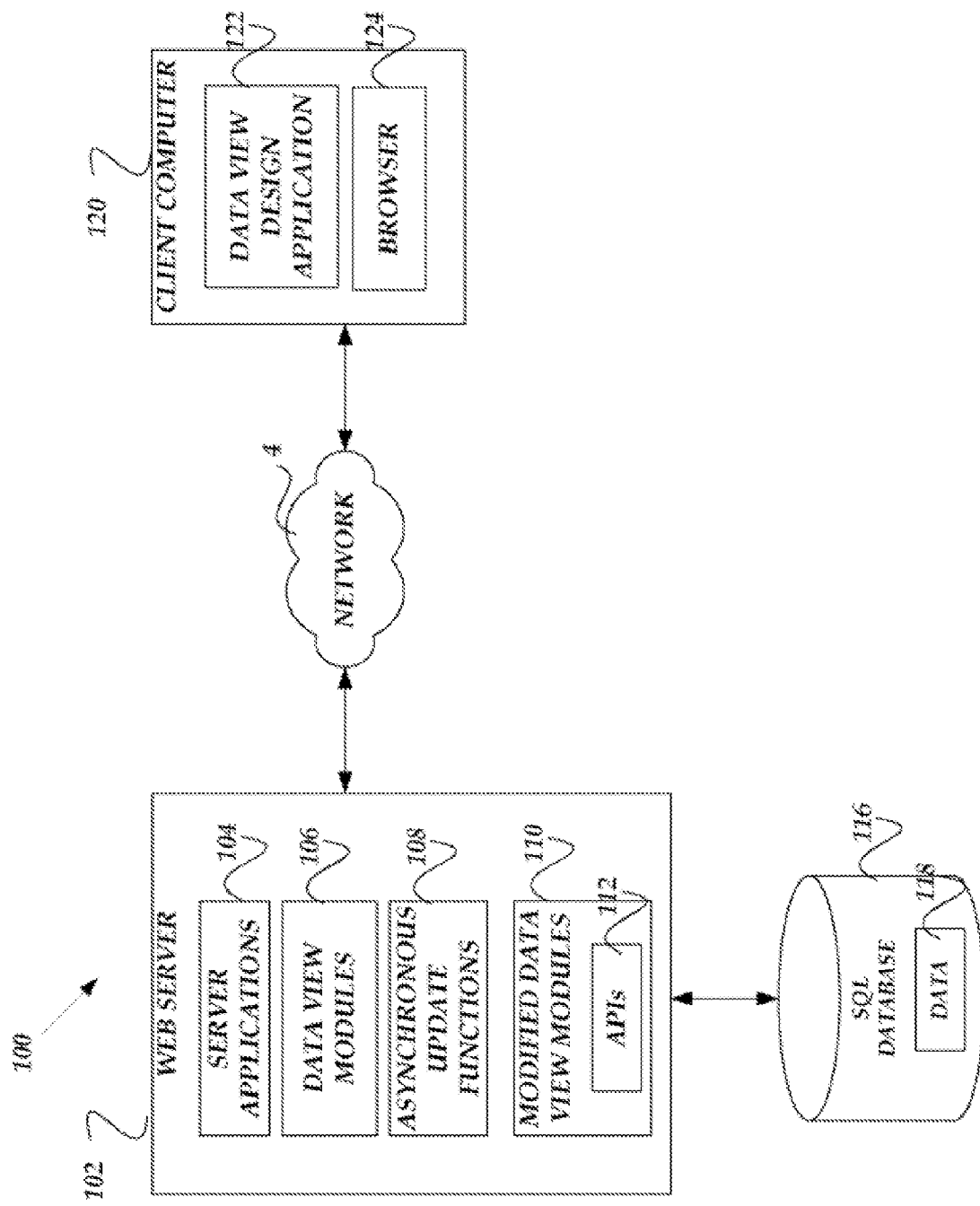
FIG. 1 is a network architecture diagram of a system configured to create and manage data view modules for asynchronously updating data on a web page, in accordance with various embodiments.

Referring now to the drawings, in which like numerals represent like elements, various illustrative embodiments will now be described. FIG. 1 is a network architecture diagram of a computer system 100 that is configured to create and manage data view modules for asynchronously updating data on a web page. In one embodiment, various components in the computer system 100 may be configured using SHAREPOINT services technology developed by MICROSOFT CORPORATION of Redmond, Wash. As is known to those skilled in the art, SHAREPOINT services technology enables users to create, maintain, and present a collaborative environment to share information. Using the technology, a user or organization can create a web site to provide and share information (e.g., documents on a web server or web folder, etc.) for other users associated with the web site. For example, users can use a number of document templates or fragments to prepare documents which are generated by members of a particular workgroup in a business organization. It should be understood that the embodiments described herein should not be construed as being limited to SHAREPOINT services technology and that other collaborative services technology from other developers and/or manufacturers may also be utilized. The computer system 100 and its components include functionality to communicate with other computing devices, communication devices, and/or other systems and are not intended to be limited to the embodiments and examples described herein.

As shown in FIG. 1, the computer system 100 includes, without limitation, a web server 102 which is in communication with a structured language query ("SQL") database 116 and also in communication with a client computer 120 over a network 4. In one embodiment, the web server 102 may be configured to utilize SHAREPOINT services technology to create a collaborative environment for retrieving data from the SQL database 116 and delivering the retrieved data in web pages to the client computer 120. In particular, in accordance with one embodiment, the web server 102 may be configured as a SHAREPOINT platform and run the SHAREPOINT SERVER and SHAREPOINT SERVER FOR SEARCH application programs, both of which are from MICROSOFT CORPORATION of Redmond, Wash. It should be appreciated, however, that web server application programs from other manufacturers may also be utilized to embody the various aspects of the technical features discussed herein.

In accordance with various embodiments, the web server 102 may include various program modules and application programs including, without limitation, server applications 104, data view modules 106, asynchronous update functions 108, and modified data view modules 110. It should be appreciated that the aforementioned program modules and application programs may be utilized to create and manage modified data view modules which enable the asynchronous updating of data views on a web page without having to reload the entire web page. As is known to those skilled in the art and as defined herein, a "data view" is a display area on a web page for viewing data which may be independent of other data also displayed on the web page (the other data may also be displayed in one or more additional data views).

The server applications 104 may be configured deliver web pages (including content contained in the data view modules 106 and the modified data view modules 110) to the client computer 120. In an embodiment, the server applications 104 may comprise the SHAREPOINT SERVER and SHAREPOINT SERVER FOR SEARCH application programs discussed above.

The data view modules 106 may be configured to display a data view which may include data retrieved from the SQL database 116. It should be understood that the data view modules 106 are static and thus may only be updated upon the reloading (or refreshing) of a web page. It should further be understood by those skilled in the art that each of the data view modules 106 may comprise a data form web part class which provides the functionality for displaying a data view on a web page.

The asynchronous update functions 108 may comprise a function library including program code which may be utilized to incorporate dynamic functionality into static data view modules. In particular, those skilled in the art should appreciate that the asynchronous update functions 108 may be utilized to build on top of existing data form web part classes to create data views which may allow the updating of data (which may include data filtering, sorting, and the viewing of additional data operations), without having to reload or refresh an entire web page. In one embodiment, the asynchronous update functions 108 may comprise Asynchronous JavaScript and XML ("AJAX") functionality. As is known to those skilled in the art, AJAX utilizes a combination of a number of Web-based technologies including extensible markup language (XML) and JavaScript which enables applications to make updates to a user interface without reloading the entire web page.

The modified data view modules 110 may be configured to utilize the asynchronous update functions 108 to display data in a data view on a web page which may be updated without having to reload or refresh the web page. In particular, and as should be understood by those skilled in the art, the modified data view modules 110 may comprise a modified data form web part class which has been built from a standard data form web part class by referencing a library containing the asynchronous update functions 108 and incorporating the functionality provided by these functions into the web part class (e.g., by writing new program code into the class). It should also be understood, in accordance with various embodiments, that in addition to updating data without the reloading of web pages, a data view corresponding to a modified data view module 110 may also be configured to be updated asynchronously or independently of other data views which may be present on the same web page. The modified data view modules 110 also include application programming interfaces ("APIs") 112. As will be described in greater detail below with respect to FIG. 6, the modified data view modules 110 may be configured to expose the APIs 112 to provide data view module developers access to the update functionality provided by the asynchronous update functions 108. Thus, it will be appreciated that a data view module developer may "call" the exposed APIs 112 to provide access to the asynchronous update functions 108 when building on top of developer data form web part classes to create customized data view modules. The functionality of the modified data view modules 110 will be discussed in greater detail below with respect to FIGS. 3-6.

The SQL database 116 is in communication with the web server 102 and stores data 118. The SQL database 116 may be utilized by the data view modules 106 and the modified data view modules 110 on the web server 102 to retrieve the data 116 for display in data views on a web page.

The client computer 120 is in communication with the web server 102 and may include a data view design application 122 and a browser 124. As discussed above, the client computer 120 may be configured to receive web pages including data views from the web server 102. In accordance with various embodiments, the data view design application 122 may provide a user interface which may be utilized by a user to open a website, select data (from the SQL database 116 for example) for display in a data view by a modified data view module 110, and insert the data view in a web page for viewing and for asynchronous updating in the browser 124, without having to reload or refresh the web page. In accordance with an embodiment, the data view design application 122 may comprise the SHAREPOINT DESIGNER application program and the browser 124 may comprise the INTERNET EXPLORER browser application program, both of which are from MICROSOFT CORPORATION of Redmond, Wash. It should be appreciated, however, that application programs from other manufacturers may also be utilized to embody the various aspects of the technical features discussed herein. An illustrative routine for utilizing the data view design application 122 to insert data views in a web page will be described in greater detail below with respect to FIG. 5.

Exemplary Operating Environment

Figure 2:
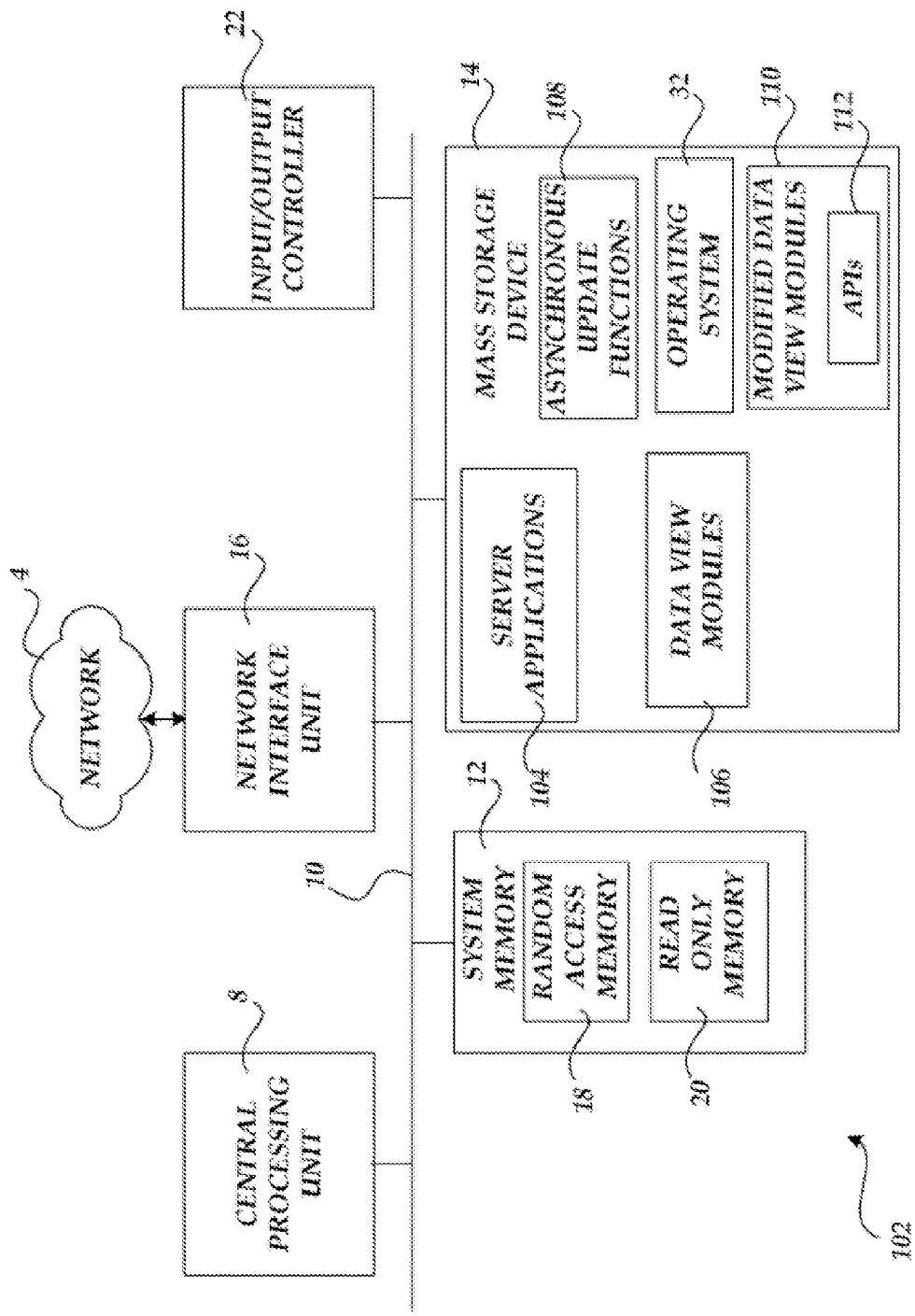
FIG. 2 is a block diagram illustrating a computing environment for implementing various embodiments described herein.

Referring now to FIG. 2, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 2, the web server 102 comprises a server computer which may include a general purpose desktop, laptop, handheld, tablet, or other type of computer capable of executing one or more application programs. The web server 102 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The web server 102 further includes a mass storage device 14 for storing an operating system 32, the server applications 104, the data view modules 106, the asynchronous update functions 108, and the modified data view modules 110 (including the APIs 112). The mass storage device 14 is connected to the CPU 8 through a mass storage controller (not shown) connected to the bus 10. The mass storage device 14 and its associated computer-readable media provide non-volatile storage for the web server 102. Although the description of computer-readable media contained herein refers to a mass storage device, such as a hard disk or CD-ROM drive, it should be appreciated by those skilled in the art that computer-readable media can be any available media that can be accessed or utilized by the web server 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the web server 102.

According to various embodiments of the invention, the web server 102 may operate in a networked environment using logical connections to remote computers through the network 4 which may be a local network or a wide area network (e.g., the Internet), for example. The web server 102 may connect to the network 4 through a network interface unit 16 connected to the bus 10.

It should be appreciated that the web server 102 may also be utilized to connect to other types of networks and remote computing systems. The web server 102 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the web server 102, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store the server applications 104, the data view modules 106, the asynchronous update functions 108, and the modified data view modules 110.

Figure 3A:
FIG. 3A is a screenshot diagram of an illustrative web page showing multiple data views, in accordance with various embodiments.

FIG. 3A is a screenshot diagram of an illustrative web page 300 showing multiple data views, in accordance with various embodiments. The web page 300 includes a stock quotes data views 302 for displaying stock information, a weather forecasts data view 304 for displaying weather information, and a news headlines data view 306 for displaying news information. As will be described in greater detail below with respect to FIG. 4, the data views 302, 305, and 306 may comprise the modified data view modules 110 which enable the displayed data to be asynchronously updated, filtered, sorted, and manipulated without the web page 300 having to be refreshed or reloaded.

Figure 3B:
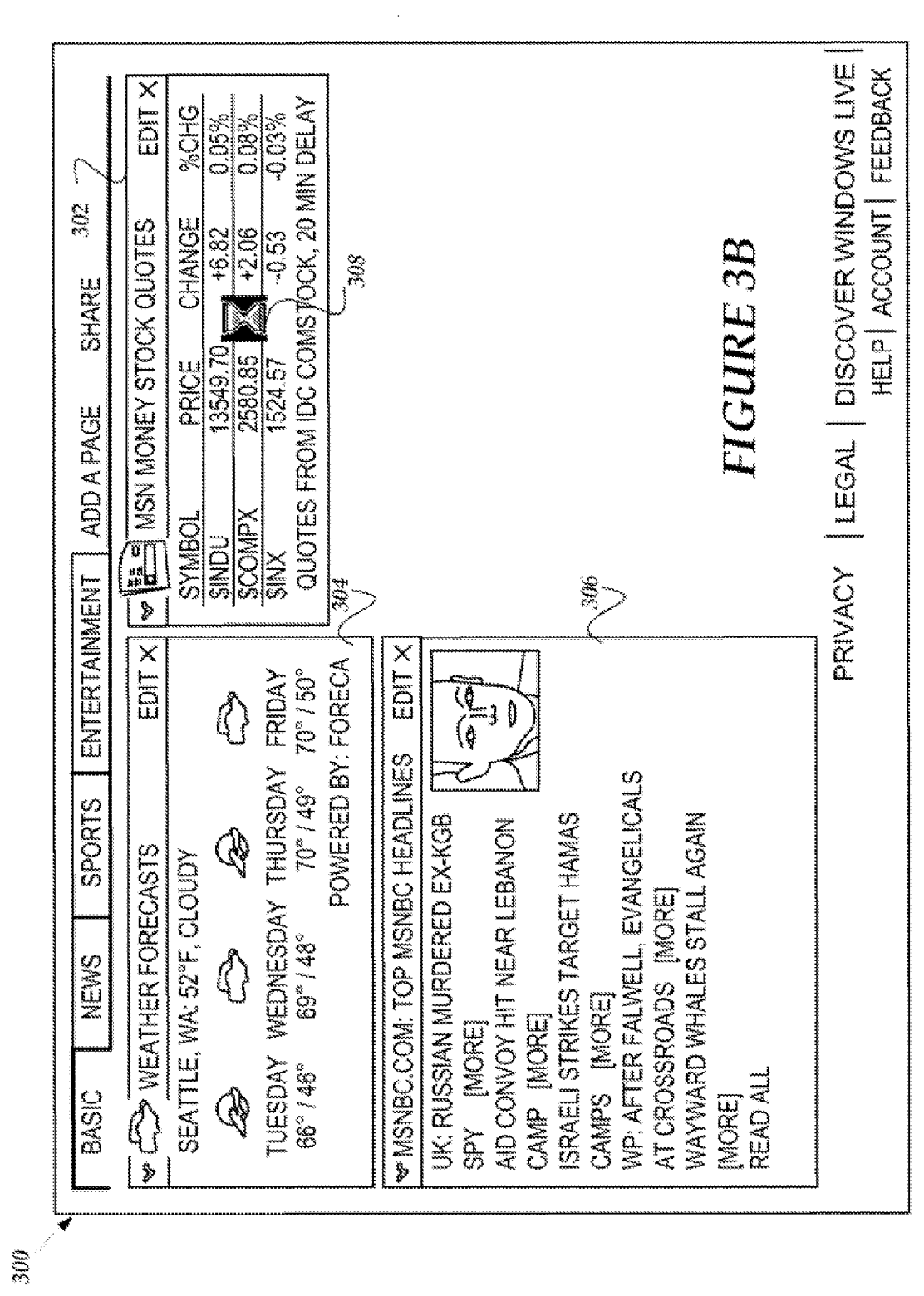

FIG. 3B is a diagram of the illustrative web page 300 showing a visual indicator signifying that a data view is asynchronously being updated in a web page, in accordance with various embodiments. The web page 300 includes the data views 302, 304, and 306 described above in FIG. 3A and also includes an hourglass indicator 308. The indicator 308 may signify that the data view 302 is currently being updated while the data views 304 and 306 are not being updated (i.e., the data view 302 is being updated asynchronously). As will be described in greater detail below with respect to FIG. 4, the indicator 308 may be displayed by the browser 124 when a data view is being asynchronously updated in the web page 300. It will be appreciated that the indicator 308 may include any number of indicia for signifying an asynchronous update including, but not limited to, an icon, shading (e.g., the data view undergoing an update may be shaded or grayed out), color coding, and the like.

FIG. 3C is a diagram of the illustrative web page 300 showing an asynchronously updated data view, in accordance with various embodiments. The web page 300 includes the data views 302, 304, and 306 described above in FIG. 3A. As shown in the PRICE, CHANGE, and % CHG columns in the data view 302, the stock quote information has been updated from the previous web page 300 while the weather forecast information in the data view 304 and the news information in the data view 306 remain unchanged from the web page 306.

Figure 4:
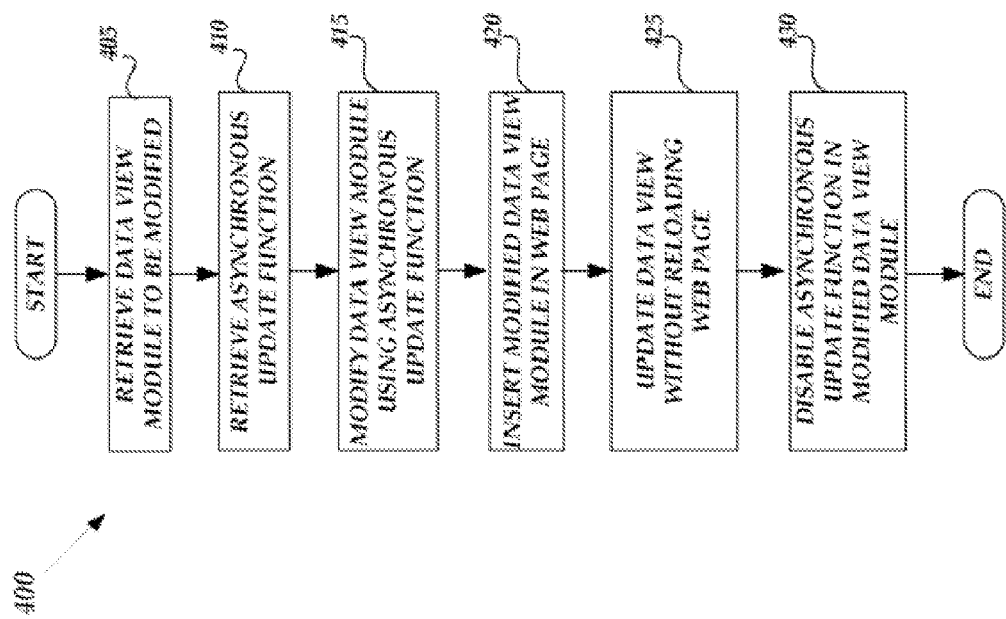
FIG. 4 is a flow diagram illustrating a routine for building a modified data view module and utilizing the modified data view module for asynchronously updating a web page data view, in accordance with various embodiments.

FIG. 4 is a flow diagram illustrating a routine 400 for building a modified data view module and utilizing the modified data view module for asynchronously updating a web page data view, in accordance with various embodiments. The components of FIGS. 1 and 2 are referred to in the description of FIG. 4, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-6 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 405, where, in response to user input, the server applications 104 retrieve a data view module to be modified. In particular, a developer may select one or more of the data view modules 106 to incorporate asynchronous update functionality contained in the asynchronous update functions 108.

From operation 405, the routine 400 continues to operation 410, where, in response to user input, the server applications 104 retrieve an asynchronous update function 108 to incorporate into the selected data view module 104. As discussed above, the asynchronous update functions 108 may comprise AJAX functionality and be utilized modify static data views to create data views which may allow the updating of data (which may include data filtering, sorting, and the viewing of additional data operations), without having to reload or refresh an entire web page.

From operation 410, the routine 400 continues to operation 415, where, in response to user input, the server applications 104 modify the selected data view module 104 using the retrieved asynchronous update function 108. As discussed above, a modified data view module may be built from a standard or static data form web part class by referencing a library containing the asynchronous update functions 108 and incorporating the functionality provided by these functions into the web part class (e.g., by writing new program code into the data for web part class).

From operation 415, the routine 400 continues to operation 420, where, in response to user input, the server applications 104 insert the modified data view module (e.g., one of the modified data view modules 110) into a web page for displaying a data view. From operation 420, the routine 400 continues to operation 425 where the inserted modified data module 110 updates the displayed data view without reloading the web page. In particular, and as discussed above, the modified data view modules 110 may be configured to utilize the asynchronous update functions 108 to display data in a data view on a web page which may be updated without having to reload or refresh the entire web page and also which may be updated asynchronously or independently of other data views which may be present on the same web page. It should be understood that the modified data view modules 110, in updating a data view without reloading a web page, may be configured to perform a number of additional functions with respect to data in a data view. For example, a modified data view module 110 may be configured to allow a user to select a portion of the displayed data in a data view (e.g., by hovering a pointer over a selected data portion with a pointing device) and display a window with additional details concerning the selected data portion. As another example, a modified data view module 110 may be configured to allow a user to reorder tabular data by dragging and dropping columns so that the displayed data is presented in a different fashion (e.g., a user could reorder customer data so that customer telephone numbers are shown before customer names). As still another example, a modified data view module 100 may be configured to filter displayed data as well as sort data (e.g., tabular data) such that the data is updated (as a result of the filtering and/or sorting operations) without reloading the entire web page. As an example of filtering displayed data, the modified data view module 100 would enable a user typing in a search engine web page to view possible matches while typing and as the user continued to type, the matches would be updated (i.e., filtered) from an original list without having to reload the search engine web page.

From operation 425, the routine 400 continues to operation 430, where, in response to user input, the server applications 104 may be utilized to disable the asynchronous update functionality in a modified data view module 110. In particular, a modified data view module 110 may be configured to include a property which will allow a user to turn the update functionality off from a default "on" state. Another property which may be included in a modified data view module 110 may include a frequency setting for automatically updating a data view. For example, a user may set a modified data view module 110 to automatically update a data view every five seconds. From operation 430, the routine 400 then ends.

Figure 5:
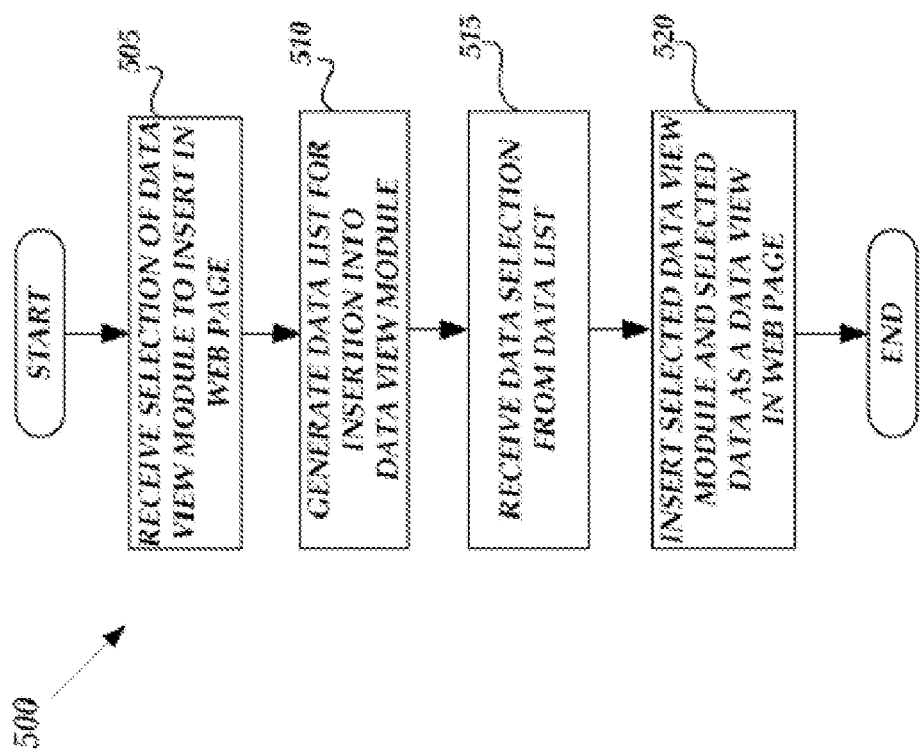
FIG. 5 is a flow diagram illustrating a routine for selecting and inserting a data view module for asynchronously updating a web page data view, in accordance with various embodiments.

Turning now to FIG. 5, a flow diagram illustrating a routine 500 for selecting and inserting a data view module for asynchronously updating a web page data view, in accordance with various embodiments, will now be described. It should be understood that the logical operations making up the routine 500 may be performed on the client computer 120 in the computer system 100 of FIG. 1 utilizing the data view design application 122. The routine 500 begins at operation 505, where the data view module design application 122 receives a selection of a data view module to insert in a web page. In particular, and as discussed above, the data view design application 122 may provide a user interface which may be utilized by a user to open a website and insert a modified data view module 110 from the web server 102 for displaying a data view on a web page which may be asynchronously updated without reloading or refreshing the web page.

From operation 505, the routine 500 continues to operation 510, where the data view design application 122, in response to receiving a selected data view module 110, generates a data list for insertion into the selected data view module 110. In particular, the data view design application 122 may be configured to communicate with the SQL database 116 (through the web server 102) and generate the data list so that a user may select the data to be displayed in the data view generated by the selected data view module 110.

From operation 510, the routine 500 continues to operation 515, where the data view design application 122 receives the selected data from the SQL database 116 for insertion into the selected data view module 110. From operation 515, the routine 500 continues to operation 520, where the data view design application 122 inserts the selected data view module 110 and the selected data as a data view in the web page. From operation 520, the routine 500 then ends.

Figure 6:
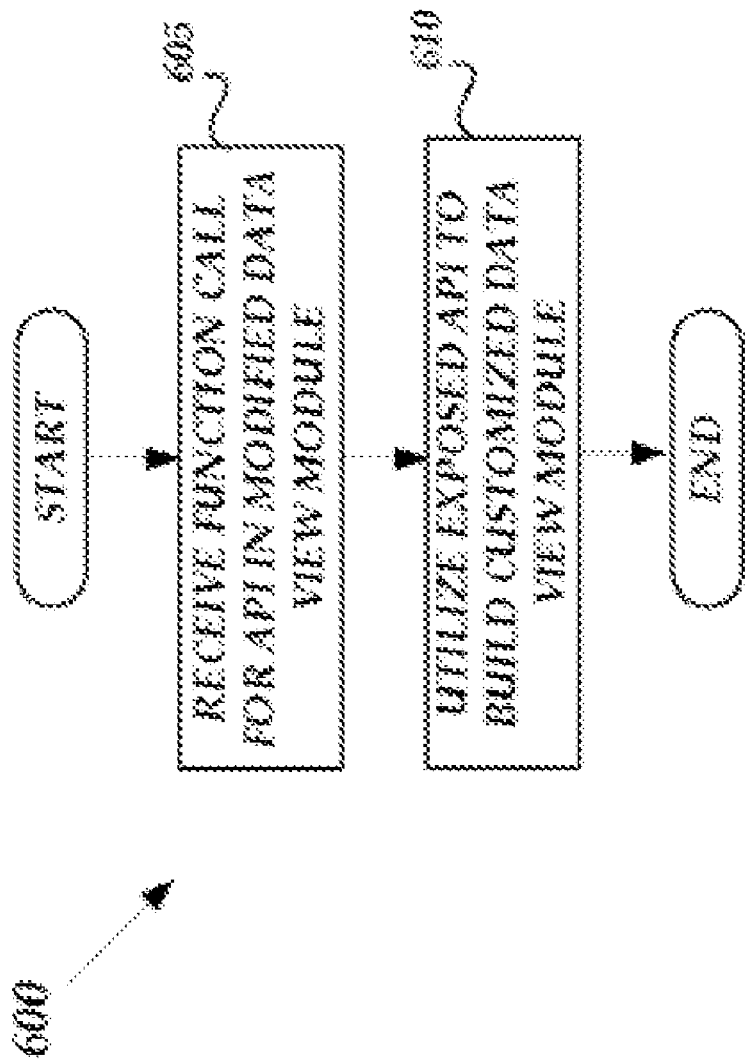
FIG. 6 is a flow diagram illustrating a routine for building a customized data view module for asynchronously updating a web page data view, in accordance with various embodiments.

Turning now to FIG. 6, a flow diagram illustrating a routine 600 for building a customized data view module for asynchronously updating a web page data view, in accordance with various embodiments, will now be described. The routine 600 begins at operation 605, where a modified data view module 110 receives an API 112 function call on the web server 102. As discussed above, the modified data view modules 110 include APIs 112 and may be configured to expose the APIs 112 to provide data view module developers access to the update functionality provided by the asynchronous update functions 108.

From operation 605, the routine 600 continues to operation 610, where a developer may utilize the exposed API to build a customized data view module on top of a modified data view module 110 to asynchronously update data corresponding to the customized data view module on the web page. It should be appreciated by those skilled in the art that a function call to the exposed APIs 112 provides web page developers access to the asynchronous update functions 108 when building on top of developer created data form web part classes to create customized data view modules having asynchronous update functionality, without having to manually write multiple lines of code. From operation 610, the routine 600 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of asynchronously updating a data view in a web page in a computer system, comprising:
   retrieving a data view module to be modified on the web page;
   retrieving at least one asynchronous update function;
   modifying the data view module utilizing the at least one asynchronous update function, wherein modifying the data view module comprises:
      referencing a library comprising a plurality of asynchronous update functions; and
      incorporating functionality provided by the plurality of asynchronous update functions into a static data form web part class by writing, by the computer system, new program code into data for the static data form web part class;
   inserting the modified data view module in the web page;
   updating a data view in the web page corresponding to the modified data view module without reloading the web page, wherein updating the data view without reloading the entire web page comprises:
      in response to a user input, manipulating the position of one or more columns comprising data in the data view by dragging and dropping the one or more columns so that displayed data in the data view is presented in a different fashion;
      filtering data in the data view against other data stored in a database in the computer system, wherein the web page comprises a search engine web page and wherein filtering data comprises:
         receiving a first user input in the search engine web page to view matches for a search while the first user input is being received in the search engine web page; and
         updating the matches from an original list of matches for the search as a subsequent user input, following the first user input, is being received in the search engine web page without reloading the search engine web page; and
      displaying additional data in response to a selection of data in the data view, wherein the data is selected by hovering a pointer over a selected portion of the data in the data view, wherein the additional data is displayed in user interface window in response to a selected portion of data displayed in the data view, wherein the additional data comprises additional details concerning the selected portion of data; and
      displaying a visual indicator on the web page while the data view is being updated, wherein the visual indicator comprises at least one of an icon, shading of the data view being updated, and color coding.

2. The method of claim 1 further comprising disabling the asynchronous update function in the modified data view module.

3. The method of claim 1, wherein retrieving at least one asynchronous update function comprises retrieving at least one Asynchronous JavaScript and XML (AJAX) function.

4. The method of claim 1, wherein updating the data view without reloading the entire web page further comprises automatically refreshing data in the data view, the web page comprising a plurality of additional data views which are not updated.

5. The method of claim 1, wherein updating the data view without reloading the entire web page further comprises sorting data in the data view.

6. A computer system for displaying on a display device a data view for asynchronously updating data on a web page, comprising:
   a memory for storing executable program code; and
   a processor, functionally coupled to the memory, the processor being responsive to computer-executable instructions contained in the program code and operative:
      to receive a selection of a data view module to insert into the web page;
      in response to receiving the selection of the data view module, to generate a list of data for insertion into the data view module;
      to receive a data selection from the data list;
      to insert the selected data view module and the selected data as a data view into the web page, the inserted data view asynchronously updating the selected data on the web page without reloading other data displayed on the web page, wherein the selected data view module comprises a modified data view module, the modified data view module comprising a modified data form web part class, wherein the modified data form web part class is built by referencing a library comprising a plurality of asynchronous update functions which are incorporated into a standard data form web part class using new program code written, by the computer system into data associated with the standard data form web part class;
      to manipulate, in response to a user input, the position of one or more columns comprising data in the inserted data view by dragging and dropping the one or more columns so that displayed data in the data view is presented in a different fashion;
      to filter data in the inserted data view against other data stored in a database in the computer system, wherein the web page comprises a search engine web page and wherein in filtering data, the processor is further operative:
         to receive a first user input in the search engine web page to view matches for a search while the first user input is being received in the search engine web page; and
         to update the matches from an original list of matches for the search as a subsequent user input, following the first user input, is being received in the search engine web page without reloading the search engine web page; and
      to display additional data in response to a selection of data in the inserted data view, wherein the data is selected by hovering a pointer over a selected portion of the data in the inserted data view, wherein the additional data is displayed in user interface window in response to the selected portion of data displayed in the inserted data view, wherein the additional data comprises additional details concerning the selected portion of data.

7. The system of claim 6, wherein the processor is further operative to display a visual indicator on the web page while the selected data is being asynchronously updated on the web page.

8. The system of claim 6, wherein the selected data from the data list is stored in a database.

9. The system of claim 8, wherein the database comprises a structured query language (SQL) database.

10. The system of claim 7, wherein the visual indicator comprises at least one of an icon, shading of the data view being updated, and color coding.

11. A computer-readable storage medium comprising computer-executable instructions which, when executed on a computer, will cause the computer to perform a method of building a customized data view from a modified data view module for asynchronously updating data on a web page, the method comprising:

receiving a function call for at least one exposed application program interface (API) in the modified data view module, wherein the modified data view module comprises a modified data form web part class, wherein the modified data form web part class is built by referencing a library comprising a plurality of asynchronous update functions which are incorporated into a standard data form web part class using new program code written, by the computer, into data associated with the standard data form web part class; and utilizing the at least one exposed API to build a customized data view module on top of the modified data view module to asynchronously update data corresponding to the customized data view module on the web page, wherein asynchronously updating the data corresponding to the customized data view module on the web page comprises:

in response to a user input, manipulating the position of one or more columns comprising data in the data view by dragging and dropping the one or more columns so that displayed data in the data view is presented in a different fashion;

filtering data in the data view against other data stored in a database in the computer system, wherein the web page comprises a search engine web page and wherein filtering data comprises:

receiving a first user input in the search engine web page to view matches for a search while the first user input is being received in the search engine web page; and updating the matches from an original list of matches for the search as a subsequent user input, following the first user input, is being received in the search engine web page without reloading the search engine web page; and displaying additional data in response to a selection of data in the data view, wherein the data is selected by hovering a pointer over a selected portion of the data in the data view, wherein the additional data is displayed in user interface window in response to a selected portion of data displayed in the data view, wherein the additional data comprises additional details concerning the selected portion of data.

12. The computer-readable storage medium of claim 11, wherein the modified data form data view module class comprises an AJAX function.

\* \* \* \* \*